(12) United States Patent
Kawai et al.

(10) Patent No.: US 7,637,856 B2
(45) Date of Patent: Dec. 29, 2009

(54) MACHINE TOOL WITH SPINDLE CHUCK REPLACING FUNCTION

(75) Inventors: Hidetsugu Kawai, Inuyama (JP); Haruaki Kozawa, Inuyama (JP)

(73) Assignee: Murata Machinery, Ltd., Kyoto-shi (JP)

( * ) Notice: Subject to any disclaimer, the term of this patent is extended or adjusted under 35 U.S.C. 154(b) by 0 days.

(21) Appl. No.: 12/399,535

(22) Filed: Mar. 6, 2009

(65) Prior Publication Data

US 2009/0233775 A1 Sep. 17, 2009

(30) Foreign Application Priority Data

Mar. 14, 2008 (JP) ............... 2008-065899

(51) Int. Cl.
*B23Q 3/155* (2006.01)
*B23B 31/00* (2006.01)

(52) U.S. Cl. ............... 483/20; 279/901; 82/129; 82/124; 82/142; 29/38 B

(58) Field of Classification Search ............... 483/20, 483/19, 17, 14, 901; 82/129, 124, 125, 142; 279/901, 900; 29/38 B, 38 R
See application file for complete search history.

(56) References Cited

U.S. PATENT DOCUMENTS

| 3,762,035 | A | * | 10/1973 | Ledergerber et al. ........ 29/38 B |
| 3,779,110 | A | * | 12/1973 | Harman et al. ............... 483/20 |
| 4,019,410 | A | * | 4/1977 | Staszkiewicz ................ 82/124 |
| 4,563,925 | A | | 1/1986 | Link |
| 2009/0238654 | A1 | * | 9/2009 | Jaeger et al. .................. 409/12 |

FOREIGN PATENT DOCUMENTS

| JP | 58-196904 A | 11/1983 |
| JP | 2001-232564 A | 8/2001 |
| JP | 2001-341001 A | 12/2001 |

OTHER PUBLICATIONS

Machine Translaton of JP-2001-232564, which '564 was published on Aug. 28, 2001.*

* cited by examiner

*Primary Examiner*—Erica E Cadugan
(74) *Attorney, Agent, or Firm*—Westerman, Hattori, Daniels & Adrian, LLP

(57) ABSTRACT

An object of the present invention is to provide a machine tool with a spindle chuck replacing function which has a simple configuration and enables a reduction in work replacement time. The machine tool with the spindle chuck replacing function includes a spindle 3, a spindle motor 4, a plurality of spindle chucks 5, 5, a spindle chuck replacing mechanism 10, a pre-rotation motor 7, a rotation speed sensing arrangement, and a replacement spindle motor speed control device. The replacement spindle motor speed control device controls the rotation speed of the spindle motor 4 according to a speed sensed by the rotation speed sensing arrangement so that when the spindle chuck replacing mechanism 10 passes the spindle chuck located at a spindle opposite position P1 to a chuck coupling portion 3*a* of the spindle 3, the rotation speed of the spindle 3 synchronizes with the rotation speed of the spindle chuck 5 located at the spindle opposite position P1.

3 Claims, 13 Drawing Sheets

4:Spindle motor
5:Spindle chuck
7:Pre-rotation motor
10:Spindle chuck replacing mechanism
13: Pre-rotation motor power cut-off means
14: Rotation speed sensing means
P1: Spindle opposite position
P2:Work replacement position
W: Work 1: Machine tool
2: Spindle support member
3 : Spindle
3a:Chuck coupling portion 4: Spindle motor
5: Spindle chuck
7: Pre-rotation motor
10: Spindle chuck replacing mechanism
13: Pre-rotation motor power cut-off means
14: Rotation speed sensing means
P1: Spindle opposite position
P2: Work replacement position
W: Work 1a Machine tool
63 Rotation force transmitting means

MACHINE TOOL WITH SPINDLE CHUCK REPLACING FUNCTION

FIELD OF THE INVENTION

The present invention relates to a machine tool with a spindle chuck replacing function, and for example, to a technique of installing and removing a work without the need to stop a spindle motor.

BACKGROUND OF THE INVENTION

With a machine tool such as a lathe, when a processed work gripped by a spindle chuck is replaced with a new one by a loader or the like, rotation of a spindle is stopped, and the loader receives the processed work. The loader then passes a new work to the spindle chuck. Thereafter, the spindle motor is rotated to start up the spindle so as to increase the rotation speed of the spindle up to a value required for processing. Thus, replacement of the work on the spindle chuck requires an amount of time for decelerating and stopping the spindle, an amount of time for delivering the work, and an amount of time for starting up the spindle so as to appropriately rotate the spindle. This work replacement time is a factor prolonging processing cycle time. In particular, for processing in which only a short time is required to process the work by means of a tool contacting with the work, the work replacement time accounts for most of the cycle time.

In a proposed lathe allowing a reduction in work replacement time, two spindles are provided on a spindle head so that the each of the spindles can be switched between a processing position and a standby position; while a work on the spindle located at the processing position is being processed, a work on the spindle located at the standby position is replaced with a new one (see, for example, the Unexamined Japanese Patent Application Publication (Tokkai-Sho) No. 58-196904). One spindle motor is used to drive the spindles and power is transmitted to the spindle located at the processing position.

Another lathe has been proposed in which a spindle head with a spindle and a spindle motor supported thereon are installed on each of the opposite sides of one tool rest so that while a work on a first spindle is being processed, a work on a second spindle is replaced with a new one, and the second spindle is started up so as to rotate appropriately (see, for example, the Unexamined Japanese Patent Application Publication (Tokkai-Hei) No. 2001-341001).

In the proposed example in which the two spindles are provided and rotated by the common spindle motor, the processed work and the new work can be passed to and from the spindle chucks during the processing time. However, the operation of starting up the spindle so as to appropriately rotate the spindle needs to be performed after the spindle located at the standby position reaches the processing position. This prevents a reduction in the time required to start up the spindle so as to appropriately rotate the spindle, which time is included in the work replacement time.

The above-described lathe including the two spindles and the two spindle motors is excellent in reducing the replacement time. However, the lathe needs to include the two spindles, the two spindle motors, and the two spindle heads, thus requiring a large-scale facility and high facility costs.

SUMMARY OF THE INVENTION

An object of the present invention is to provide a machine tool with a spindle chuck replacing function which has a simple configuration and which enables a reduction in work replacement time.

Another object of the present invention is to provide a machine tool with a spindle chuck replacing function which prevents an excessive force from being exerted when a spindle chuck is coupled to a spindle.

Yet another object of the present invention is to provide a machine tool with a spindle chuck replacing function which enables a reduction in time required to control the rotation speed of a spindle motor.

A machine tool with a spindle chuck replacing function according to the present invention includes a spindle having a chuck coupling portion with a spindle chuck replaceably coupled to a tip thereof, the spindle being rotatably supported on a spindle support member, a spindle motor rotationally driving the spindle, a plurality of spindle chucks having a function of holding a work and replaceably coupled to the chuck coupling portion of the spindle, a spindle chuck replacing mechanism rotatably holding the plurality of spindle chucks and transferring any the spindle chucks from a spindle opposite position to a work replacement position where a work on the spindle chuck is replaced, so as to deliver the spindle chuck to the chuck coupling portion of the spindle, a pre-rotation motor rotating the spindle chuck held at the work replacement position by the spindle chuck replacing mechanism, before the spindle chuck is placed at the spindle opposite position, a rotation speed sensing means for sensing rotation speed of the spindle chuck rotated by the pre-rotation motor, and a replacement spindle motor speed control means for controlling the rotation speed of the spindle motor according to the speed sensed by the rotation speed sensing means so that when the spindle chuck replacing mechanism passes the spindle chuck located at the spindle opposite position to the chuck coupling portion of the spindle, the rotation speed of the spindle synchronizes with the rotation speed of the spindle chuck located at the spindle opposite position.

In this configuration, during processing of a work on one spindle chuck, another spindle chuck on which a next work to be processed is held is rotated by the pre-rotation motor. After the one spindle chuck processes the work, the spindle chuck replacing mechanism transfers the another spindle chuck located at the work replacement position to the spindle opposite position to deliver the another spindle chuck to the chuck coupling portion of the spindle. In the meantime, the rotation speed sensing means senses the rotation speed of the another spindle rotated by the pre-rotation motor.

The replacement spindle motor speed control means controls the rotation speed of the spindle motor according to the speed sensed by the rotation speed sensing means so that when the second spindle chuck located at the spindle opposite position is passed to the spindle, the rotation speed of the spindle synchronizes with the rotation speed of the second spindle chuck located at the spindle opposite position. Thus, the spindle chuck can be smoothly coupled so as to synchronize the rotation speeds with each other. Then, the spindle motor controllably rotates the spindle with the another spindle chuck coupled thereto, at a rotation speed suitable for processing. The work held on the another spindle chuck is thus processed. Thereafter, this operation is repeated.

As described above, the spindle chuck located at the spindle opposite position can be coupled to the chuck coupling portion of the spindle without the need to stop rotation of the spindle, which requires time for acceleration and deceleration. Thus, with this machine tool, when the work is replaced with a new one, which is then processed, the processing can be immediately started. This enables a reduction in processing cycle time. Furthermore, in this case, it is only necessary to positionally switch the plurality of spindle chucks between the spindle opposite position and the work replacement position, eliminating the need to move the pre-rotation motor with the spindle chuck. This enables a reduction in the sizes and weights of movable members including the plurality of spindle chucks. The machine tool enables a reduction in work replacement time using the one spindle and the one spindle motor, and can thus be configured more simply than a machine tool with two spindles and two spindle motors. As a result, the facility costs can be reduced.

The machine tool may include a pre-rotation motor power cut-off means for rotating the spindle chuck held by the spindle chuck replacing mechanism and rotationally driven by the pre-rotation motor before the spindle chuck replacing mechanism performs the operation of passing the spindle chuck to the chuck coupling portion of the spindle. In this case, the pre-rotation motor rotates the spindle chuck for the next processing, and the pre-rotation motor power cut-off means then inertially rotates the spindle chuck. The inertial rotation of the spindle chuck for the next processing prevents an excessive force from being exerted when this spindle chuck is coupled to the spindle. Furthermore, the pre-rotation motor has only to preliminarily inertially rotate the spindle chuck for the next processing and need not provide such high power as that provided for processing by the spindle motor. Thus, the present machine tool requires reduced production costs compared to a machine tool with two spindles and two spindle motors.

The machine tool may include a rotation force transmitting means for transmitting a rotational driving force of the pre-rotation motor to the plurality of spindle chucks. In this case, after the spindle chuck for the next processing is rotationally driven by the pre-rotation motor, the rotation speed of the spindle motor is synchronously controlled. Immediately after this, the spindle chuck can be smoothly coupled to the spindle.

The machine tool with the spindle chuck replacing function according to the present invention includes the spindle having the chuck coupling portion with the spindle chuck replaceably coupled to the tip thereof, the spindle being rotatably supported on the spindle support member, the spindle motor rotationally driving the spindle, the plurality of spindle chucks having the function of holding the work and replaceably coupled to the chuck coupling portion of the spindle, the spindle chuck replacing mechanism rotatably holding the plurality of spindle chucks and transferring any of the spindle chucks from the spindle opposite position to the work replacement position where the work on the spindle chuck is replaced, so as to deliver the spindle chuck to the chuck coupling portion of the spindle, the pre-rotation motor rotating the spindle chuck held at the work replacement position by the spindle chuck replacing mechanism, before the spindle chuck is placed at the spindle opposite position, the rotation speed sensing means for sensing the rotation speed of the spindle chuck rotated by the pre-rotation motor, and the replacement spindle motor speed control means for controlling the rotation speed of the spindle motor according to the speed sensed by the rotation speed sensing means so that when the spindle chuck replacing mechanism passes the spindle chuck located at the spindle opposite position to the chuck coupling portion of the spindle, the rotation speed of the spindle synchronizes with the rotation speed of the spindle chuck located at the spindle opposite position. Therefore, the work replacement time can be reduced using the simple configuration.

When the machine tool includes the pre-rotation motor power cut-off means for rotating the spindle chuck held by the spindle chuck replacing mechanism and rotationally driven by the pre-rotation motor before the spindle chuck replacing mechanism performs the operation of passing the spindle chuck to the chuck coupling portion of the spindle, the pre-rotation motor power cut-off means prevents an excessive force from being exerted when the spindle chuck is coupled to the spindle.

When the machine tool includes the rotation force transmitting means for transmitting the rotational driving force of the pre-rotation motor to the plurality of spindle chucks, the rotation force transmitting means enables a reduction in time required to control the rotation speed of the spindle motor.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 is a schematic view of the machine tool.

DETAILED DESCRIPTION OF THE PREFERRED EMBODIMENTS

Figure 1:
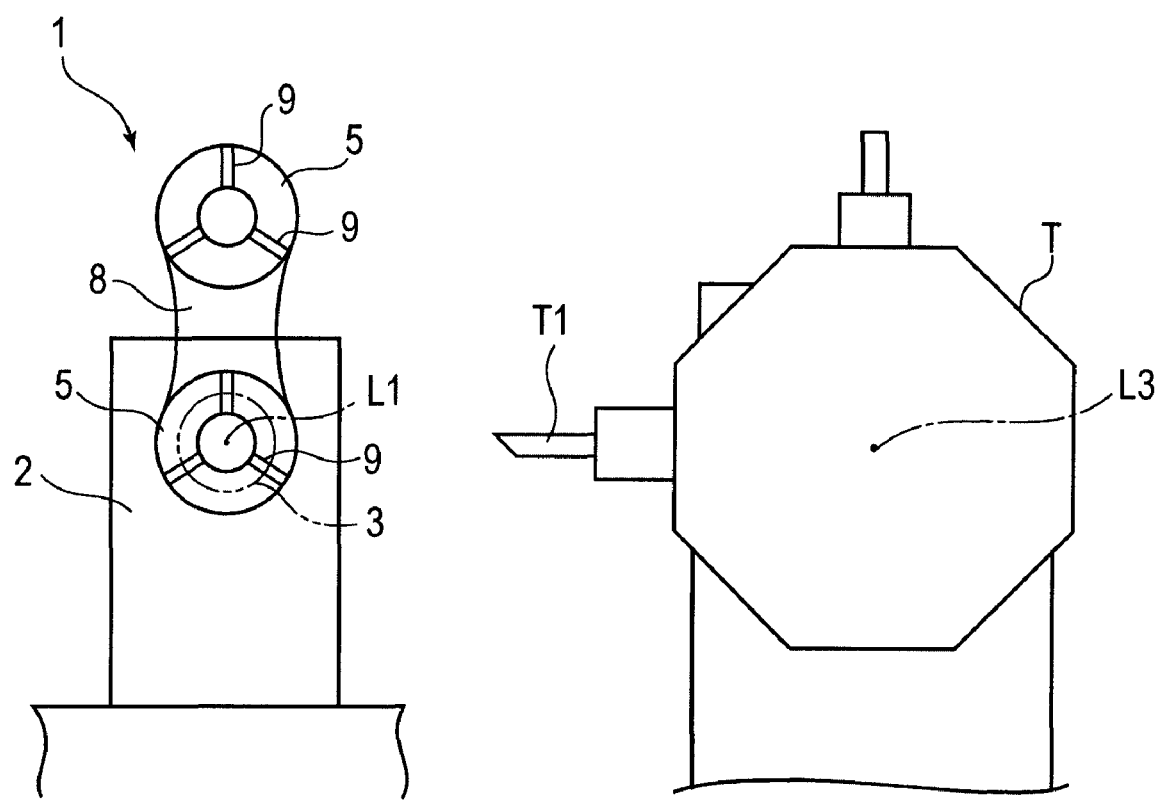
FIG. 1 is a front view of a machine tool with a spindle chuck replacing function according to a first embodiment of the present invention.
Figure 2:
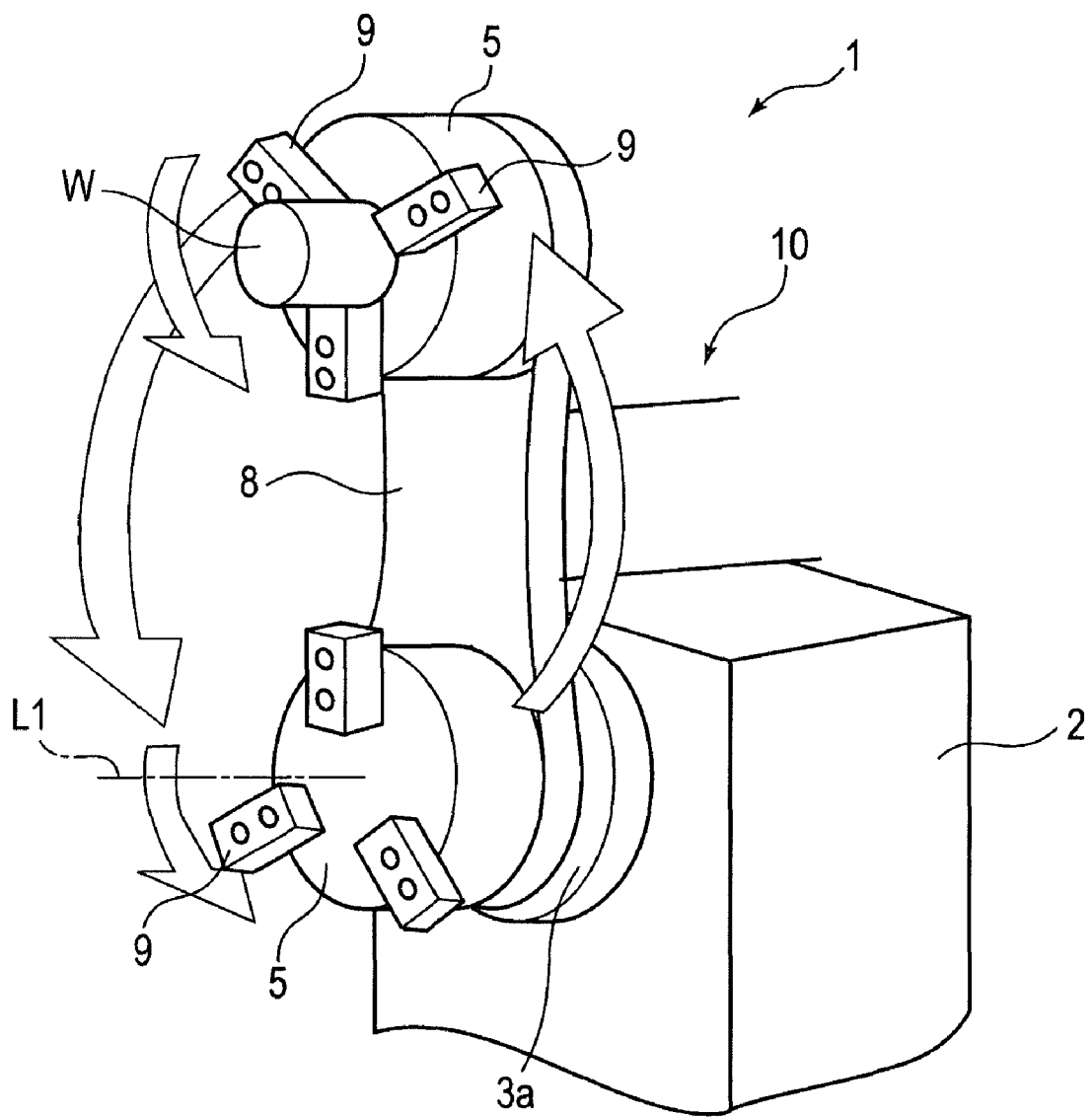
FIG. 2 is a perspective view showing a spindle chuck and the like of the machine tool.

A first embodiment of the present invention will be described with reference to FIGS. 1 to 12.

As shown in FIGS. 1 to 5, a machine tool 1 with a spindle chuck replacing function according to the first embodiment is a turret type lathe and has a spindle support member 2, a spindle 3, a spindle motor 4, two spindle chucks 5, 5, a chuck loader 6, a pre-rotation motor 7, a replacement spindle motor speed control means 21 (FIG. 12), and a tool rest T.

The spindle support member 2 is composed of a spindle head provided on a bed (not shown in the drawings). The spindle 3 is supported on the spindle support member 2 by a spindle bearing so as to be rotatable around an axis L1. The spindle 3 has, at an axial tip thereof, a chuck coupling portion 3a to which the two spindle chucks 5, 5 are replaceably coupled. The spindle motor 4 is provided in the spindle support member 2 to rotationally drive the spindle 3. As shown in FIG. 1, the tool rest T is composed of a turret. The tool rest T is located so as to be indexingly rotatable near the spindle 3 and around an axis L3 parallel to the spindle 3. Tools T1 attached to the tool rest T are used to process a work W held by the spindle chuck 5 coupled to the chuck coupling portion 3a shown in FIGS. 2 and 4. On the tool rest T, the tools T1 are attached to respective tool stations arranged on an outer periphery of the tool rest T in a circumferential direction. Each of the tools T1 may be a fixed tool such as a cutting tool or a rotating tool such as a milling head or a drill. Furthermore, indexable rotation of the tool rest T is performed by an indexable driving means (not shown in the drawings).

Figure 4:
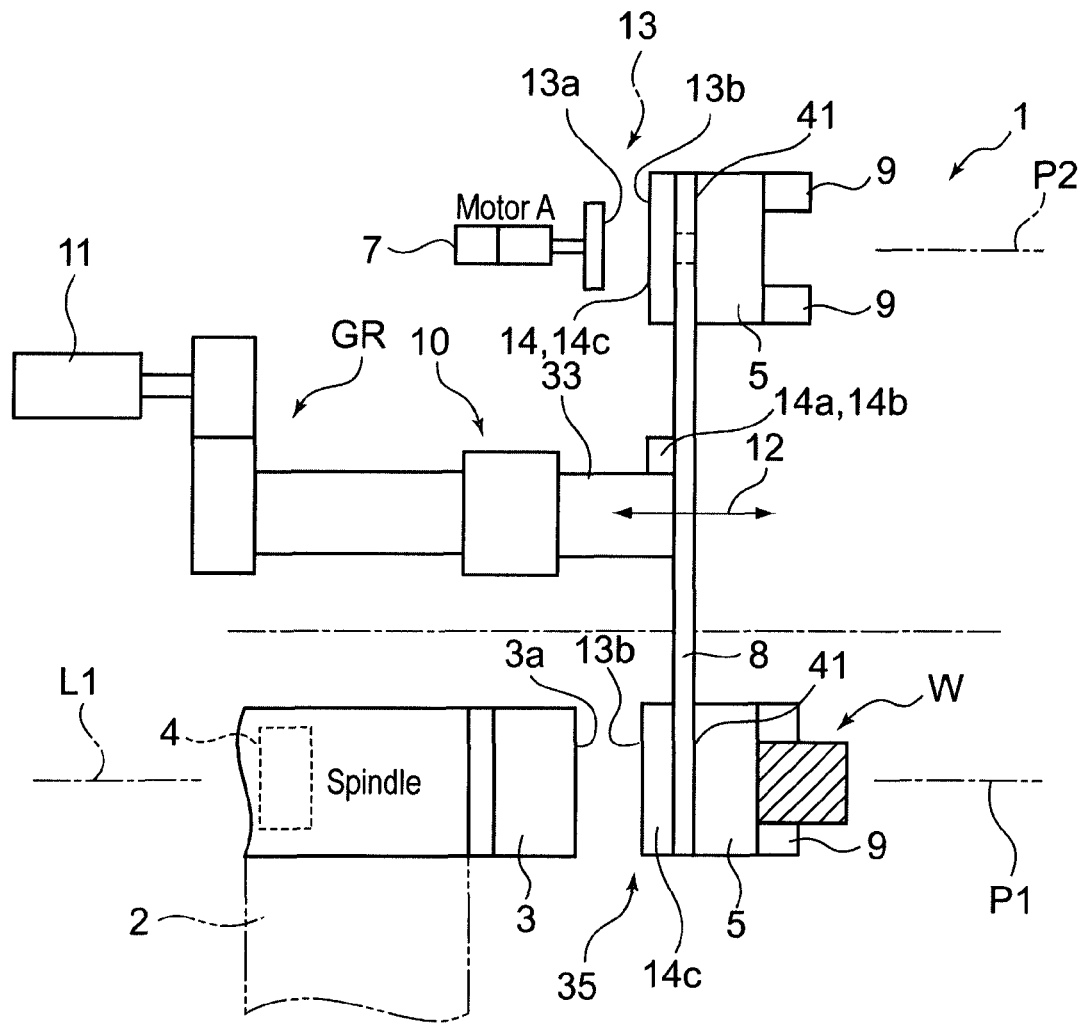
FIG. 4 is a schematic side view of the machine tool in which the spindle chuck is being replaced.

The two spindle chucks 5, 5 are provided on a turning member 8 at a predetermined distance from each other so as not to interfere with each other. The spindle chucks 5, 5 are arranged parallel to each other. Each of the spindle chucks 5 includes a chuck jaw 9 and has a function of displacing the chuck jaw 9 radially inward or outward to hold the work W. The "spindle chuck" as used herein need not exert a strong gripping force enough to deal with full specifications of the spindle but include a spindle chuck like a jig which temporarily grips the spindle. As shown in FIG. 4, the chuck loader 6 has a spindle chuck replacing mechanism 10, a turning driving motor 11, a forward and backward driving source 12, and a rotation speed sensing means described below.

The spindle chuck replacing mechanism 10 will be described.

Figure 3A:
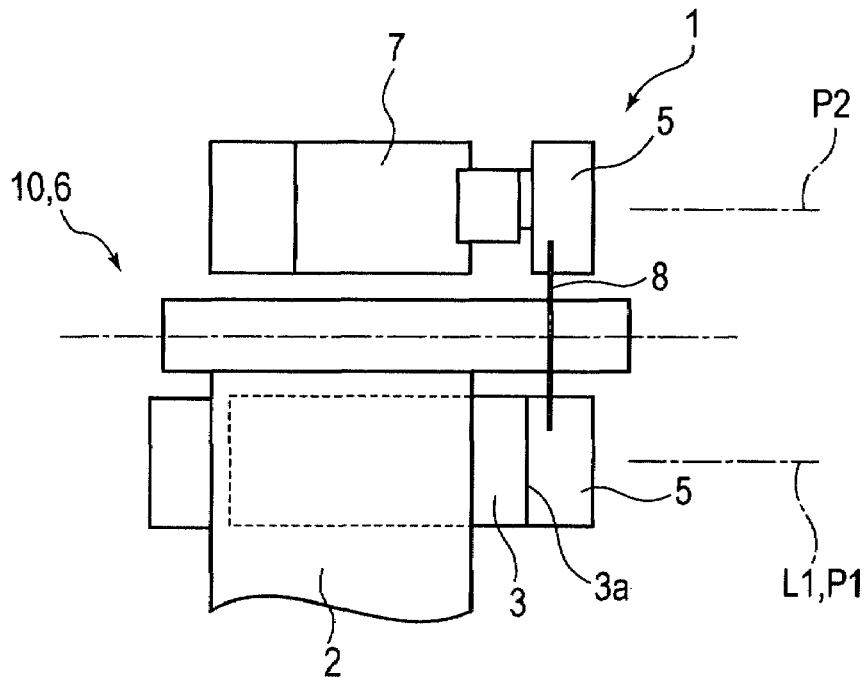
FIG. 3A is a side view of the machine tool.
Figure 3B:
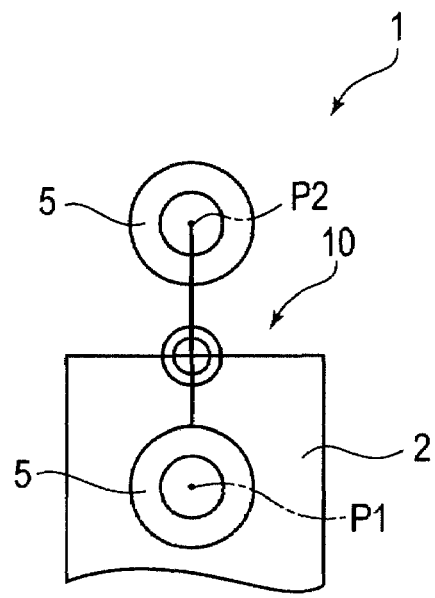
FIG. 3B is a front view of the machine tool.
Figure 5:
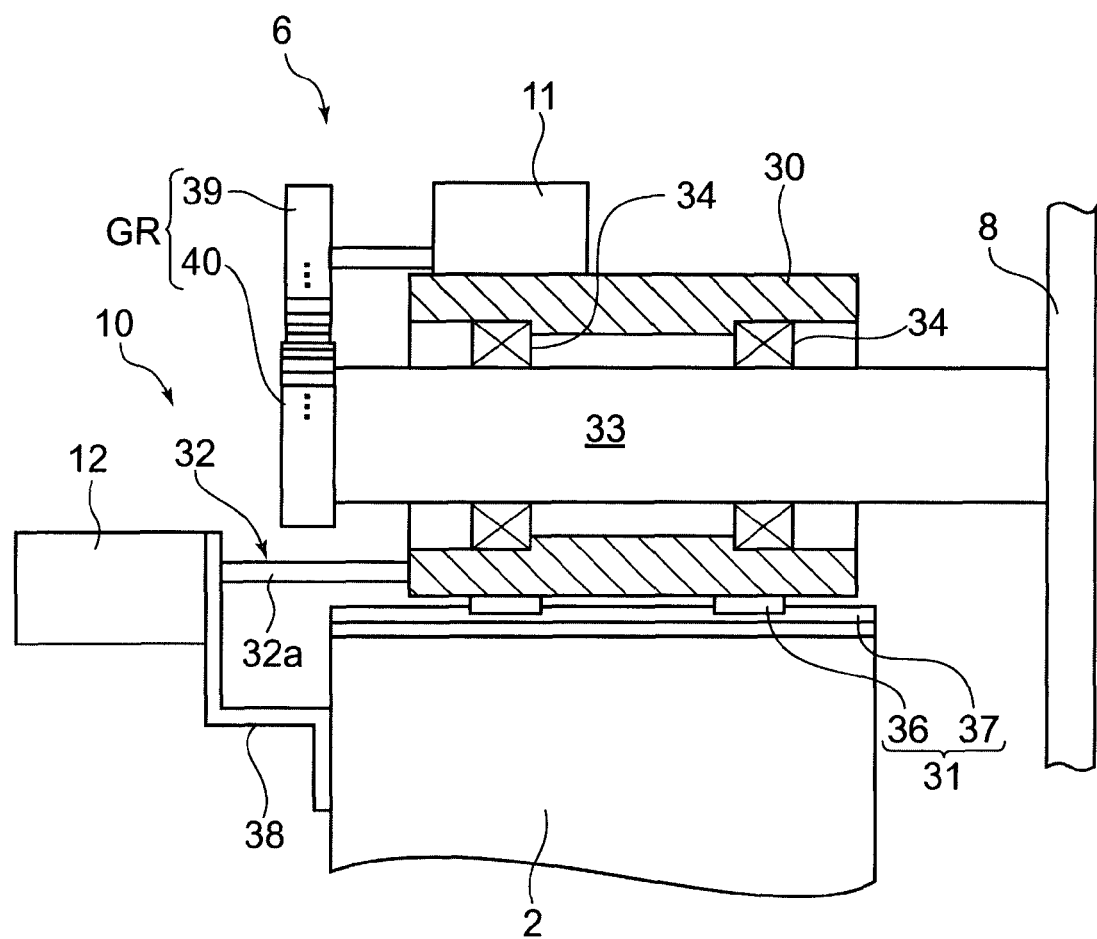
FIG. 5 is a sectional view of an essential part of a spindle chuck replacing mechanism of the machine tool.

As shown in FIGS. 3 to 5, the spindle chuck replacing mechanism 10 transfers any spindle chuck 5 from a spindle opposite position P1 to a work replacement position P2 to deliver the spindle chuck 5 to the chuck coupling portion 3a of the spindle 3.

As shown in FIG. 4, the spindle opposite position P1 is synonymous with a position where the axis of the chuck coupling portion 3a of the spindle 3 aligns with the axis of the spindle chuck 5 and where the spindle chuck 5 is located opposite the chuck coupling portion 3a at a predetermined short distance from the chuck coupling position 3a. Also as shown in FIG. 4, the work replacement position P2 is synonymous with a position where the work W on the spindle chuck 5 is replaced with a new one.

As shown in FIG. 5, the spindle chuck replacing mechanism 10 has a casing 30, a slide mechanism 31, the forward and backward driving source 12, a ball screw 32, a turning shaft 33, a bearing 34, the turning driving motor 11, a power transmitting portion GR, and a chuck engaging mechanism 35 (FIG. 4 and others). The slide mechanism 31 has a direct acting bearing 36 and a slide rail 37.

The slide rail 37 is laid on a top surface of the spindle support member 2. A plurality of the direct acting bearings 36 are secured to a bottom surface of the casing 30. The direct acting bearings 36 are guided along the slide rail 37 to allow the casing 30 to be moved in an axial direction of the spindle 3. The forward and backward driving source 12 composed of a motor is provided on the spindle support member 2 via a bracket 38. A screw shaft 32a of the ball screw 32 is rotatably supported on the bracket 38 or the like and parallel to a longitudinal direction of the slide rail 37. The screw shaft 32a is rotationally driven by the motor. Furthermore, a plurality of nut members (not shown in the drawings) for the ball screw 32 are provided on the bottom surface of the casing 30. The screw shaft 32a is threadably fitted through the nut members so that the motor is rotated to move the casing 30 in the axial direction of the spindle.

The turning shaft 33 is rotatably supported in the casing 30 via the plurality of bearings 34, 34. A first end and a second end of the turning shaft 33 projects from the casing 30. A longitudinal middle portion of the turning member 8 is secured to the first end of the turning shaft 33. The turning driving motor 11 is provided on the casing 30. The turning driving motor 11 drivingly rotates the turning shaft 33 forward or backward around the axis of the turning shaft 33 via the power transmitting portion GR, to turn the turning member 8 through 180 degrees. The power transmitting portion GR has a pinion gear 39 secured to a motor shaft of the turning driving motor 11, and a gear 40 provided at the second end of the turning shaft 33 and engaging with the pinion gear 39. Consequently, the turning driving motor 11 performs driving to transmit power from the pinion gear 39 to the gear 40 to rotate the turning shaft 33 through 180 degrees via the plurality of bearings 34, 34. Thus, the spindle chuck 5 provided at a longitudinal first or second end of the turning member 8 is placed at the spindle opposite position P1 or the work replacement position P2.

As shown in FIGS. 4 and 5, with any spindle chuck 5 gripping the work W placed at the spindle opposite position, the forward and backward driving source 12 drivingly moves the casing 30 in one axial direction to move the spindle chuck 5 closer to the chuck coupling portion 3a of the spindle 3. In this condition, the chuck engaging mechanism 35 delivers the spindle chuck 5 to the chuck coupling portion 3a.

Figure 6:
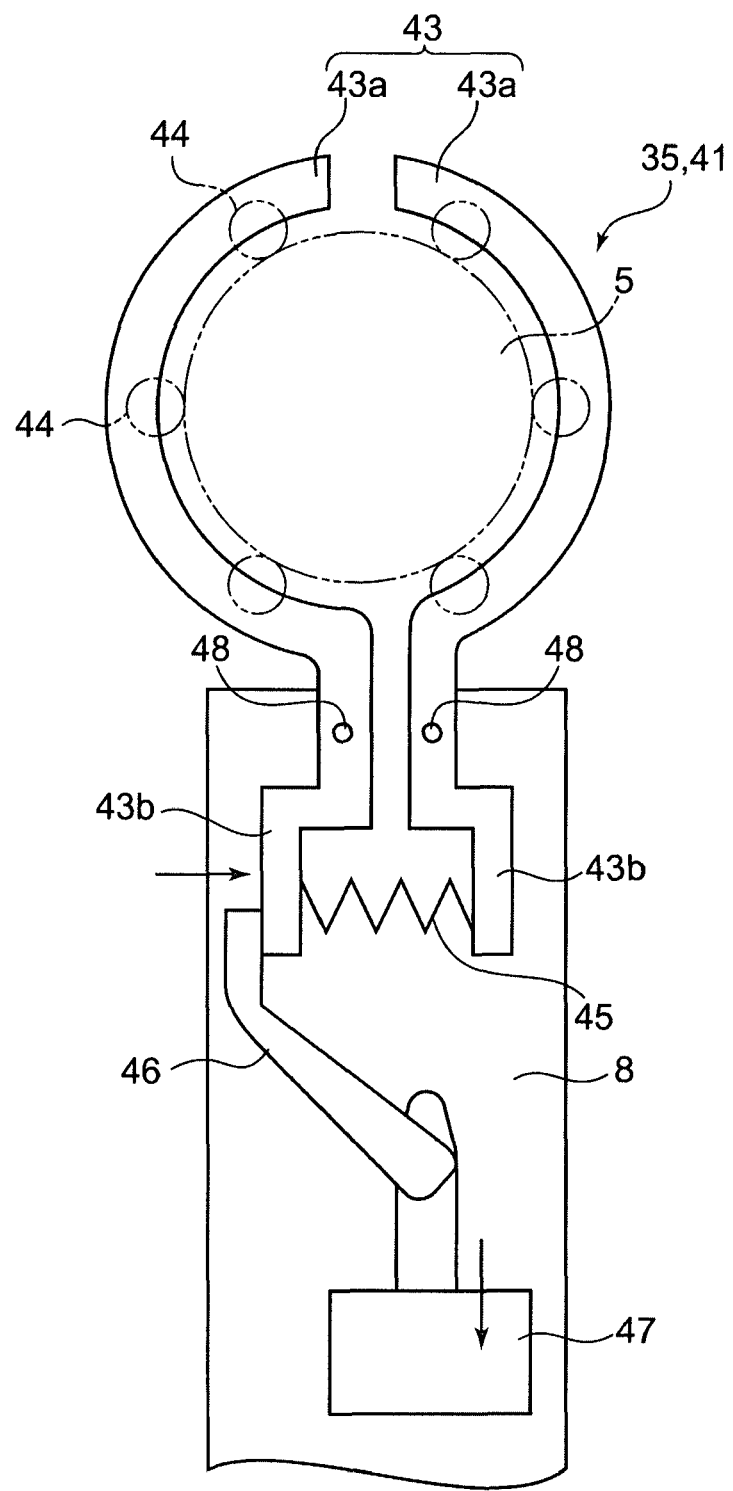
FIG. 6 is a sectional view showing the structure of a separation mechanism of the machine tool.
Figure 7:
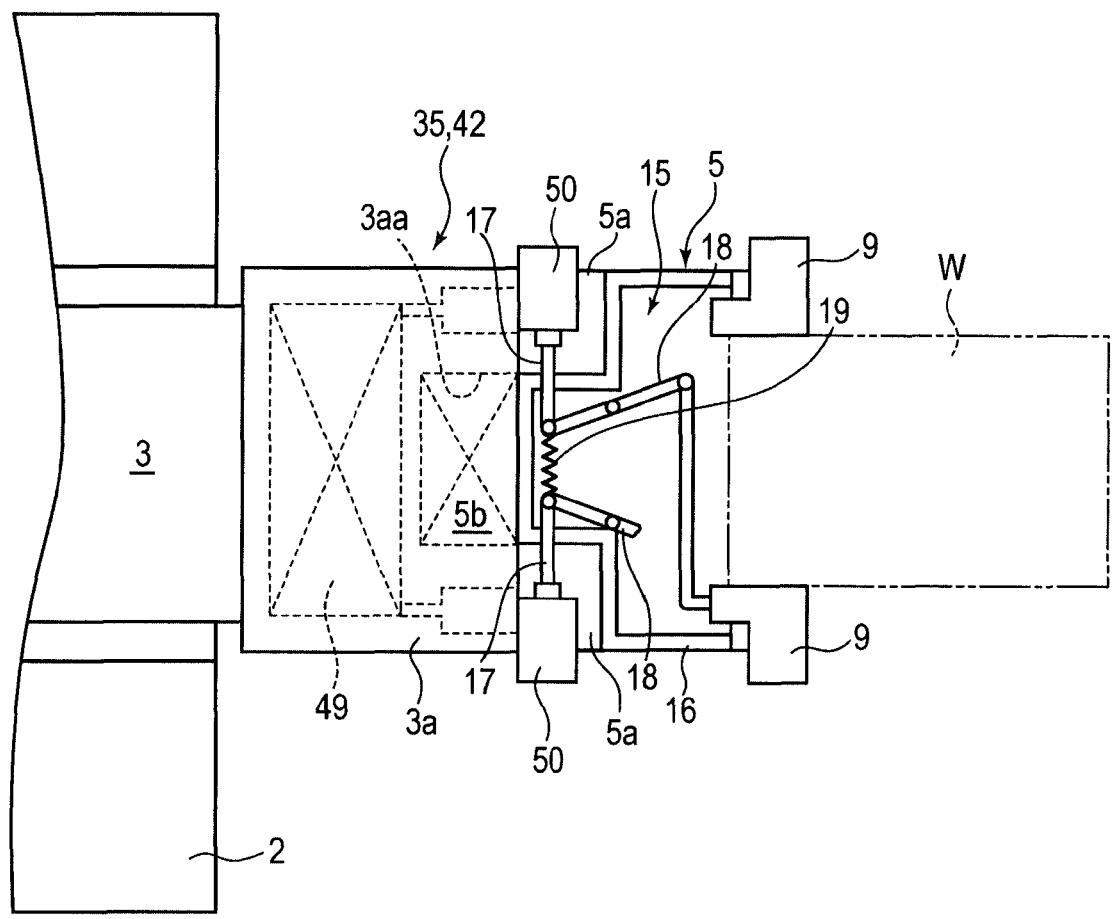
FIG. 7 is a sectional view of an essential part of a chuck engaging mechanism of the machine tool.
Figure 8:
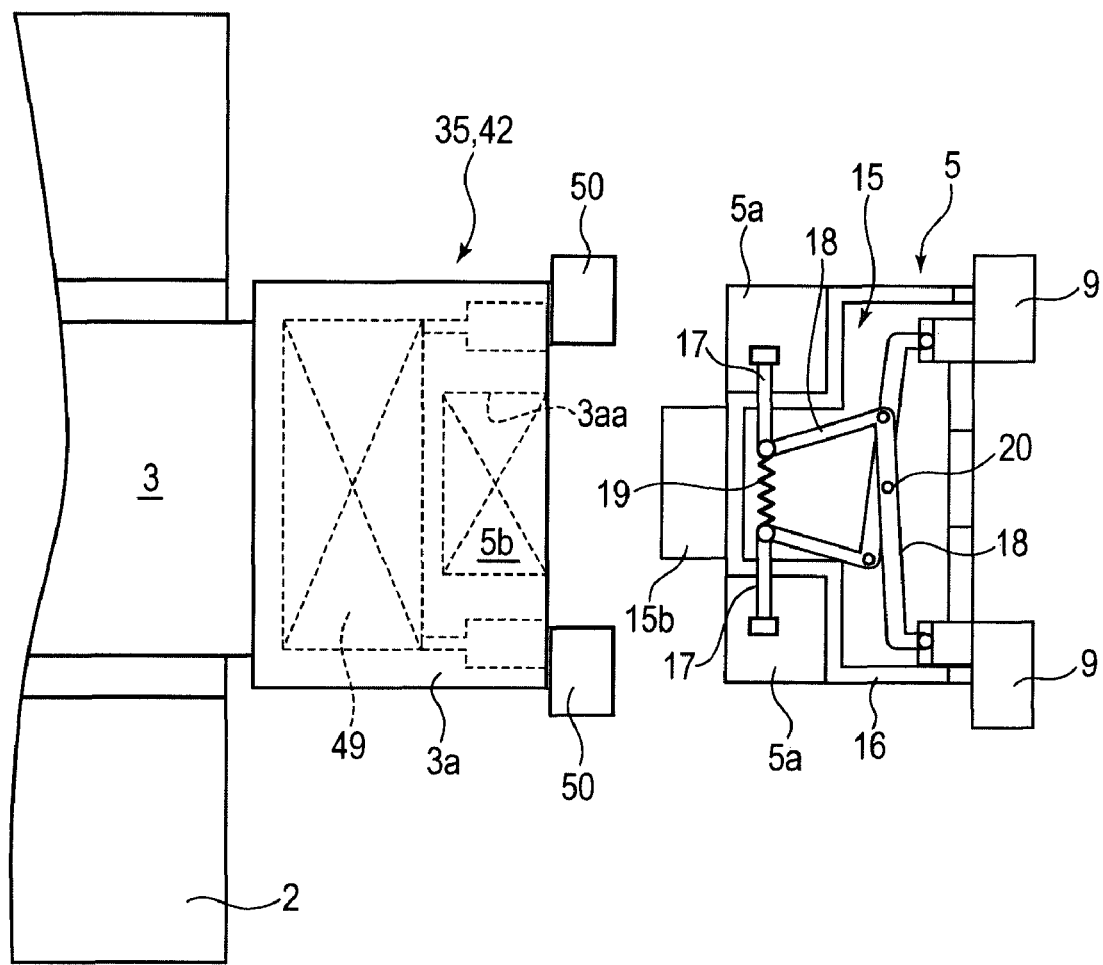
FIG. 8 is a sectional view of an essential part of the chuck engaging mechanism in which the spindle chuck has been disengaged from a chuck coupling portion.
Figure 9:
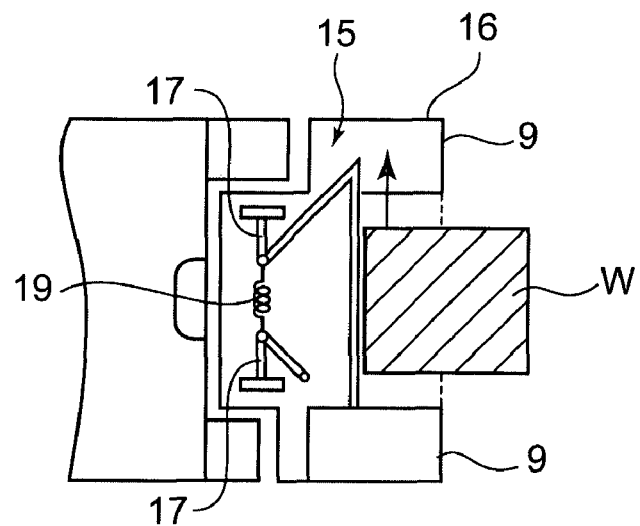
FIG. 9 is a sectional view of a work holding mechanism and the like of the spindle chuck.

As shown in FIGS. 6 to 8, the chuck engaging mechanism 35 has separation mechanisms 41, 41 that allow any spindle chuck 5 to be separately disengaged from the turning member 8 and a holding mechanism 42 that allows the chuck coupling portion 3a to hold the spindle chuck 5. The separation mechanisms 41, 41 are provided at the first and second ends, respectively, of the turning member 8. The separation mechanisms 41, 41 have the same structure. Thus, the separation mechanism 41 at the first end of the turning member 8 will be described.

As shown in FIG. 6, the separation mechanism 41 has a gripping member 43 that mostly projects from a tip of the turning member 8, a plurality of bearings 44, a spring member 45, a lever member 46, and a fluid pressure cylinder 47. The spring member 45, the lever member 46, and the fluid pressure cylinder 47 are provided in the turning member 8. The griping member 43 includes two ring members 43a, 43a into which the gripping member 43 is divided and which is supported on the turning member 8 via pins 48 or the like so as to be able to be opened and closed. The plurality of bearings 44 are disposed along an inner periphery of the ring portions 43a, 43a at regular intervals in a circumferential direction of the ring portions 43a, 43a. An outer ring of each of the bearings 44 is portioned radially inward of the inner periphery of the ring portions 43a, 43a so that the plurality of outer rings rotatably grip an outer peripheral portion of the spindle chuck 5.

The spring member 45 composed of a helical compression spring is interposed between base ends 43b, 43b of the ring portions 43a, 43a. A spring force of the spring member 45 laterally separates the base ends 43b, 43b from each other to elastically bias the ring portions 43a, 43a radially inward. Thus, the outer peripheral portion of the spindle chuck 5 is pivotally movably gripped.

The lever member 46 is swingably provided. A first end of the lever member 46 is coupled to a rod portion of the fluid pressure cylinder 47. The base end 43b of one of the ring members 43a is coupled to a second end of the lever member 46. Drivingly retracting the rod portion of the fluid pressure cylinder 47 swings the lever member 46. The base ends 43b, 43b are then moved closer to each other against the spring force of the spring member 45 to open the ring portions 43a, 43a radially outward. Thus, any spindle chuck 5 can be separately disengaged from the turning member 8.

As shown FIGS. 7 and 8, the holding mechanism 42 has an actuator 49 composed of, for example, a solenoid, and a plurality of jaws 50. An actuator 49 is provided in the chuck coupling portion 3a, and the plurality of jaws 50 are coupled to this driving portion. The jaws 50 are arranged at three points in a circumferential direction of the actuator 49 at regular intervals of 120 degrees. The actuator 49 can drivingly displace the plurality of jaws 50 radially inward and outward. Fitting holes 5a are formed in the spindle chuck 5 so that the plurality of jaws 50 can be fitted into the fitting holes 5a.

Furthermore, a recess portion 3aa is formed in the chuck coupling portion 3a to allow the spindle chuck 5 to be positioned at a concentric position of the spindle 3. A projecting portion 5b that can be fitted into the recess portion 3aa is formed on the spindle chuck 5. With the projecting portion 5b fitted into the recess portion 3aa, the jaws 50 are displaced from radially outward to radially inward to allow the chuck holding portion 3a to hold the spindle chuck 5 so as to prevent the spindle chuck 5 from rotating together with the spindle 3.

A work holding function of the spindle chuck 5 will be described.

Figure 10:
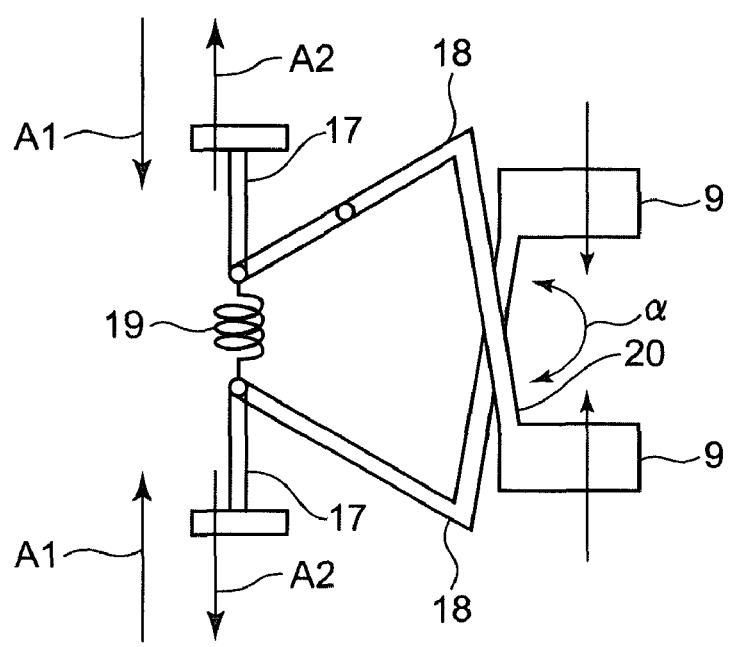
FIG. 10 is an enlarged sectional view showing the structure of an essential part of the work holding mechanism.

As shown in FIGS. 7 to 10, the spindle chuck 5 has chuck jaws 9, a work holding mechanism 15, and a casing 16. The work holding mechanism 15 is accommodated in the generally cylindrical casing 16. The work holding mechanism 15 has movable portions 17, 17, a pair of actuating levers 18, 18, and a helical tension spring 19. The movable portions 17, 17, which actuate the actuating levers 18, 18, are arranged in the casing 16 at the bottom thereof so as to lie opposite each other and at a small distance from each other in a radial direction expressed by arrows A1, A2 (FIG. 10). The helical tension spring 19 is installed at opposite tip portions of the movable portions 17, 17.

Base ends of the actuating levers 18, 18 are swingably coupled to the tip portions of the movable portions 17, 17. The vicinities of tips of the pair of actuating levers 18, 18 cross each other, and a pin 20 or the like constituting a swing support point is provided at intersection between the vicinities of the tips. The chuck jaws 9 are secured to the tip portions of the pair of actuating levers 18, 18. A spring force of the helical tension spring 19 elastically biases the tip portions of the movable portions 17, 17 in the direction of arrow A1 so that the tip portions move closer to each other. Thus, the pair of actuating levers 18, 18 swings around the swing support point to reduce the crossing angle (α) between the vicinities of the tips of the actuating levers 18, 18. Thus, the chuck jaws 9 are displaced radially inward so as to be able to hold the work W.

When the tip portions of the movable portions 17, 17 are separated from each other in the direction arrow A2 against the spring force of the helical tension spring 19, the pair of actuating levers 18, 18 is swung in a direction opposite to that described above. Thus, the crossing angle (α) between the vicinities of the tips of the actuating levers 18, 18 is increased to displace the chuck jaws 9 radially outward to allow the work W to be disengaged. A fluid pressure cylinder or the like (not shown in the drawings) is applicable as a driving source that separates the tip portions of the movable portions 17, 17 from each other.

The pre-rotation motor 7 or the like will be described.

Figure 11:
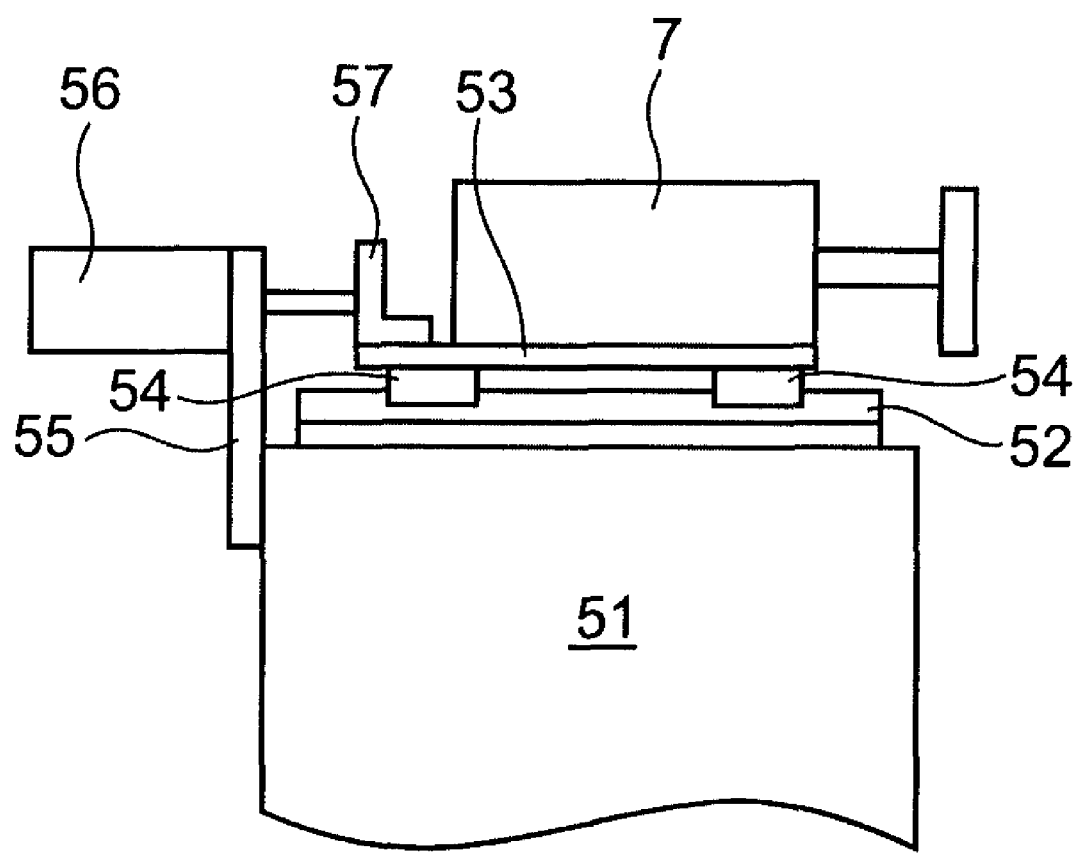
FIG. 11 is a side view showing a peripheral structure of a pre-rotation motor.

As shown in FIG. 4, the pre-rotation motor 7 rotates the spindle chuck 5 located at the work replacement position before the spindle chuck 5 is placed at the spindle opposite position P1. The pre-rotation motor 7 is configured to be moving drivable in the axial direction of the spindle 3. That is, as shown in FIG. 11, a slide rail 52 is laid on a frame 51 of the machine tool 1. A plurality of direct acting bearings 54, 54 are secured to the bottom of a plate 53 that supports the pre-rotation motor 7. The direct acting bearings 54, 54 are guided along the slide rail 52. A fluid pressure cylinder 56 is provided on the frame 51 via a mounting member 55. A bracket 57 is attached to a top surface of the plate 53. A rod of the fluid pressure cylinder 56 is coupled to the bracket 57. The fluid pressure cylinder 56 drivingly moves in and out the rod to move the plate 53 and the pre-rotation motor 7 in the axial direction of the spindle 3.

As shown in FIGS. 4 and 11, the spindle chuck 5 located at the spindle opposite position P1 is coupled to the chuck coupling portion 3a so as to be able to be rotated by the spindle motor 4. At this time, the spindle chuck 5 located at the work replacement position P2 can be rotationally driven by the pre-rotation motor 7 for the next processing. In other words, the spindle chuck 5 located at the work replacement position P2 is preliminarily rotationally drivable while the work W at the spindle opposite position P1 is being processed.

The rod of the fluid pressure cylinder 56 advances to allow a clutch serving as the pre-rotation motor power cut-off means 13 to transmit power. For example, a conical clutch is applied as the clutch. The clutch has a pre-rotation motor-side power transmitting portion 13a and a spindle chuck 5-side power transmitted portion 13b. The rod advances to allow the power transmitting portion 13a and the power transmitted portion 13b to abut against each other so that the power transmitting portion 13a can be fitted into the power transmitted portion 13b. A frictional force or the like acting on abutting surfaces the power transmitting portion 13a and the power transmitted portion 13b inhibits circumferential displacement of the power transmitted portion 13b relative to the power transmitting portion 13a. Thus, the spindle chuck 5 can be rotationally driven by the pre-rotation motor 7. The rod is retracted to separate the power transmitting portion 13a from the power transmitted portion 13b, the spindle chuck 5 is disabled from being rotationally driven by the pre-rotation motor 7. However, with the spindle chuck 5 rotationally driven by the pre-rotation motor 7, retracting the rod to separate the power transmitting portion 13a from the power transmitted portion 13b allows the spindle chuck 5 to rotate inertially.

The rotation speed sensing means 14 will be described.

The rotation speed sensing means 14 is composed of, for example, a light reflective encoder. The rotation speed sensing means 14 is a phase sensing means for detecting an absolute position. The encoder has a light source, a light receiving element, and a reflector. For example, as shown in FIG. 4, a light source 14a and a light receiving element 14b are provided at the tip portion of the turning shaft 33. A reflector 14c is provided along the outer peripheral portion of each spindle chuck 5. Light emitted by the light source 14a is reflected by the rotating reflector 14c and returns to the light receiving element 14b in the form of a repeated pattern of the presence and absence of light. The encoder converts the presence and absence of the light returning to the light receiving element 14b, into a pulse signal. The rotation speed of the spindle chuck 5 can be determined according to an arithmetic expression based on the numbers of rises and falls in pulse signal per unit time. However, the rotation speed sensing means 14 is not limited to the light reflective encoder but may be any of various encoders, a photo interrupter, or the like.

Figure 12:
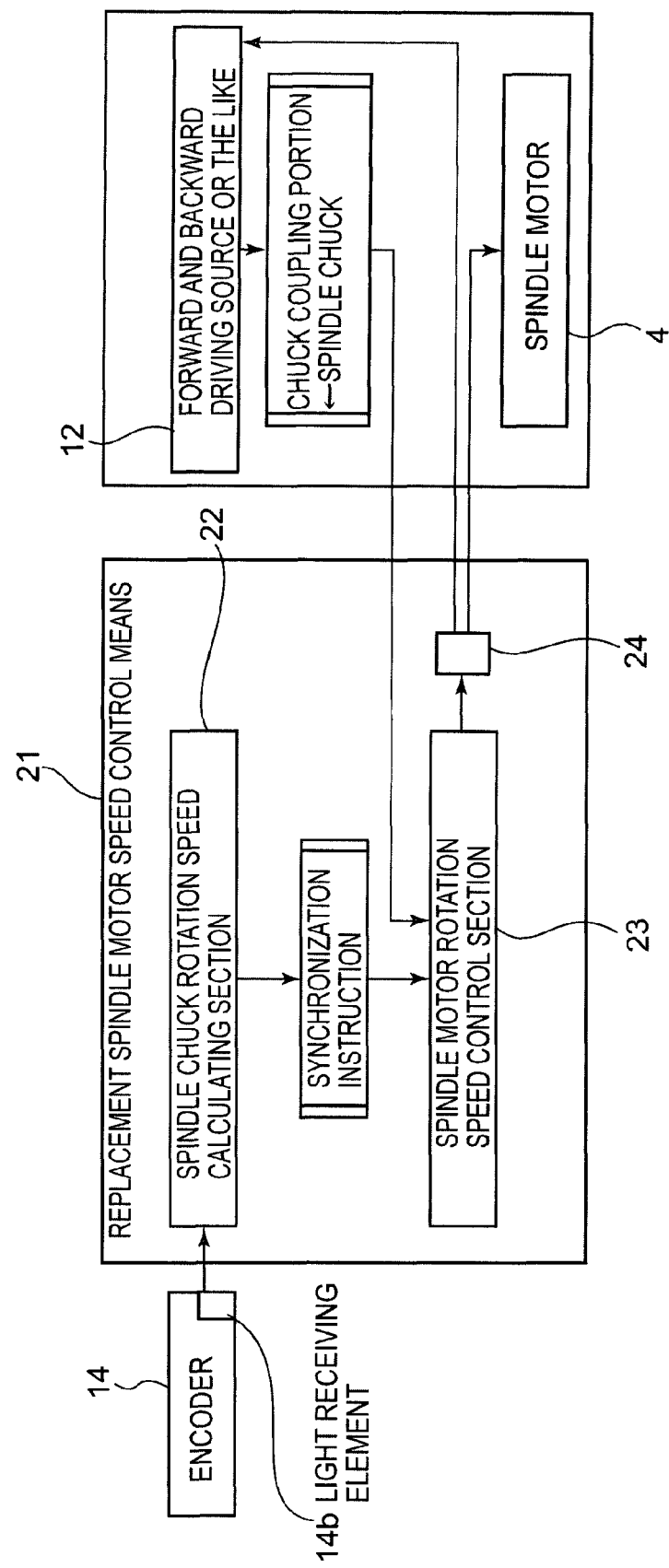
FIG. 12 is a block diagram of a control system of the machine tool.

The replacement spindle motor speed control means 21 will be described particularly with reference to FIG. 12.

The replacement spindle motor speed control means 21 includes a computerized numerical control device and a programmable controller. When the spindle chuck replacing mechanism 10 delivers the spindle chuck 5 located at the spindle opposite position P1 to the chuck coupling portion 3a, the replacement spindle motor speed control means 12 controls the rotation speed of the spindle motor 4 according to the speed sensed by the rotation speed sensing means 14 so that the rotation speed of the spindle 3 synchronizes with the rotation speed of the spindle chuck 5 located at the spindle opposite position P1. The replacement spindle motor speed control means 21 is a phase synchronizing means.

That is, the replacement spindle motor speed control means 21 mainly has a spindle chuck rotation speed calculating section 22, a spindle motor rotation speed control section 23, and a driving circuit 24 that drives the forward and backward driving source 12 of the chuck loader 6 and the spindle motor 4 based on an output from the computer. The spindle chuck rotation speed calculating section 22 is electrically connected to the light receiving element 14b of the encoder. The spindle chuck rotation speed control section 23 is electrically connected to the forward and backward driving source 12 of the chuck loader 6 and the spindle motor 4 via the driving circuit 24.

The spindle chuck rotation speed calculating section 22 stores an arithmetic program executed based on, for example, the numbers of rises and falls in pulse signal per unit time. The arithmetic program can always be arithmetically executed. After the spindle chuck 5 located at the work replacement position P2 is rotationally driven by the pre-rotation motor 7, the rod portion is expanded to separate the power transmitting portion 13a from the power transmitted portion 13b. Then, the spindle chuck 5 rotates inertially.

The spindle chuck rotation speed calculating section 22 determines the rotation speed of the inertially rotating spindle chuck 5 based on the pulse signal. The spindle motor rotation speed control section 23 controls the rotation speed of the spindle motor 4 so that the rotation speed of the spindle 3 synchronizes with the determined rotation speed. Here, the spindle motor rotation speed control section 23 determines whether or not the determined rotation speed of the spindle chuck 5 is in synchronism with the rotation speed of the spindle 3. Upon determining that the determined rotation speed of the spindle chuck 5 is not in synchronism with the rotation speed of the spindle 3, the spindle motor rotation speed control, section 23 repeats synchronous control of the rotation speed of the spindle motor 4.

Upon determining that the determined rotation speed of the spindle chuck 5 is in synchronism with the rotation speed of the spindle 3, the spindle motor rotation speed control section 23 instructs each of the driving sources of the chuck loader 6 to perform driving. Thereafter, the spindle motor rotation speed control section 23 uses a sensor or the like (not shown in the drawings) to determine whether or not the spindle chuck 5 is coupled to the chuck coupling portion 3a. Upon determining that the spindle chuck 5 is coupled to the chuck coupling portion 3a, the spindle motor rotation speed control section 23 accelerates or decelerates the spindle motor 4 from the current rotation speed to a desired one at which processing is enabled.

Operation of the above-described configuration will be described.

The tool rest T is indexably rotated to a desired position. The spindle 3 with the first spindle chuck 5 coupled to the chuck coupling portion 3a is rotationally driven by the spindle motor 4. Thus, the work W held by the first spindle chuck 5 is processed. While the work W is being processed, the pre-rotation motor 7 is used to rotate the second spindle chuck 5 holding the next work W to be processed. Thereafter, the fluid pressure cylinder 56 is used to separate the power transmitting portion 13a from the power transmitted portion 13b to allow the second spindle chuck 5 to rotate inertialty.

After the work piece W is processed using the first spindle chuck 5, the separation mechanism 41 is used to allow the gripping member 43 located at a first end of the turning member 8 to grip the first spindle chuck 5. Then, the holding mechanism 42 disengages the first spindle chuck 5 from the chuck coupling portion 3a. Thus, the spindle motor 4 is decoupled from the first spindle chuck 5. Thereafter, the forward and backward driving source 12 is driven to separate the first spindle chuck 5 from the chuck coupling portion 3a by a predetermined distance.

The rotation speed of the inertially rotating second spindle chuck 5 is sensed by the encoder. The rotation speed of the spindle motor 4 is controlled according to the rotation speed sensed by the encoder so as to synchronize with the sensed speed. The turning driving motor 11 drivingly turns the turning member 8 through 180 degrees to place the second spindle chuck 5 holding the work W, at the spindle opposite position P1. Then, the forward and backward driving source 12, the chuck engaging mechanism 35, and the like drivingly couple the second spindle chuck 5 to the chuck coupling portion 3a. At the same time, the second spindle chuck 5 is separately disengaged from the gripping member 43 of the turning member 8. Thereafter, the work W held by the second spindle chuck 5 is processed. This operation is subsequently repeated.

The above-described machine tool 1 with the spindle chuck replacing function allows the spindle chuck 5 located at the spindle opposite position P1 to be smoothly coupled to the chuck coupling portion 3a of the spindle 3, without the need to stop rotation of the spindle 3, which requires a long time for acceleration and deceleration. Thus, when the work W is replaced with a new one, which is then processed, the machine tool 1 allows the processing to be immediately started. This enables a reduction in processing cycle time. Furthermore, it is only necessary to positionally switch the two spindle chucks 5, 5 between the spindle opposite position P1 and the work replacement position P2. The pre-rotation motor 7 and the like need not be turned together with the spindle chuck 5. This enables a reduction in the sizes and weights of the movable members including the two spindle chucks 5, 5 and the turning member 8. The machine tool 1 enables a reduction in work replacement time using the one spindle 3 and the one spindle motor 4, and can thus be configured more simply than a machine tool 1 with two spindles and two spindle motors. As a result, the facility costs can be reduced.

Therefore, the required power and thus the production costs of the turning driving motor 11 can be reduced. Furthermore, the size of the machine tool 1 can be reduced, thus enabling a reduction in facility costs.

The machine tool 1 also includes the pre-rotation motor power cut-off means 13 for inertially rotating the spindle chuck 5 rotationally driven by the pre-rotation motor 7 before the operation of passing the spindle chuck 5 to the chuck coupling portion 3a of the spindle 3. The pre-rotation motor power cut-off means 13 inertially rotates the spindle chuck for the next processing to prevent an excessive force from being exerted when the spindle chuck 5 is coupled to the spindle 3. Furthermore, the pre-rotation motor 7 has only to preliminarily inertially rotate the spindle chuck 5 for the next processing and need not provide such high power as that provided for processing by the spindle motor 4. Thus, the machine tool 1 requires reduced production costs compared to a machine tool 1 with two spindles and two spindle motors.

Now, other embodiments of the present invention will be described.

In the description below, components corresponding to those described in the first embodiment are denoted by the same reference numerals, and duplicate descriptions may be omitted. If only a part of the configuration is described, the other parts of the configuration are similar to those in the already described embodiment. Not only the components specifically described in the embodiments may be combined together but also the embodiments may be partly combined together unless the combination poses a problem.

A second embodiment of the present invention will be described with reference to FIGS. 13 and 14.

In particular, a machine tool 1A with a spindle chuck replacing function according to the second embodiment includes a rotation force transmitting means 63. The rotation force transmitting means 63 has a shaft member 26, a clutch 27, a one-way clutch 59, pulleys 60, 61, and belts 28. That is, the shaft member 26 is inserted through a turning arm 25. The pre-rotation motor 7 is provided at a base end of the shaft member 26 via the clutch 27. The shaft member 26 is rotatably supported via a plurality of bearings 58, 58. Any of various clutches, for example, a jaw clutch or a gear clutch is applied as the clutch 27.

The one-way clutches 59, 59 are provided at a tip portion of the shaft member 26 adjacent to each other in an axial direction of the shaft member 26. Pulleys 60, 60 are externally fitted around outer peripheries of the respective one-way clutches 59. Pulleys 61, 61 are also externally fitted around the outer peripheral portions of the respective spindle chucks 5, 5. The belts 28 are passed around the pulleys 60, 61. The one-way clutch 59 enables transmission of only the rotational driving force of the pre-rotation motor 7 acting in one direction, while disabling transmission of the rotational driving force acting in the other direction. Furthermore, in the turning arm 25, the spindle chuck 5 is rotatably supported via a plurality of bearings 62, 62.

Figure 13:
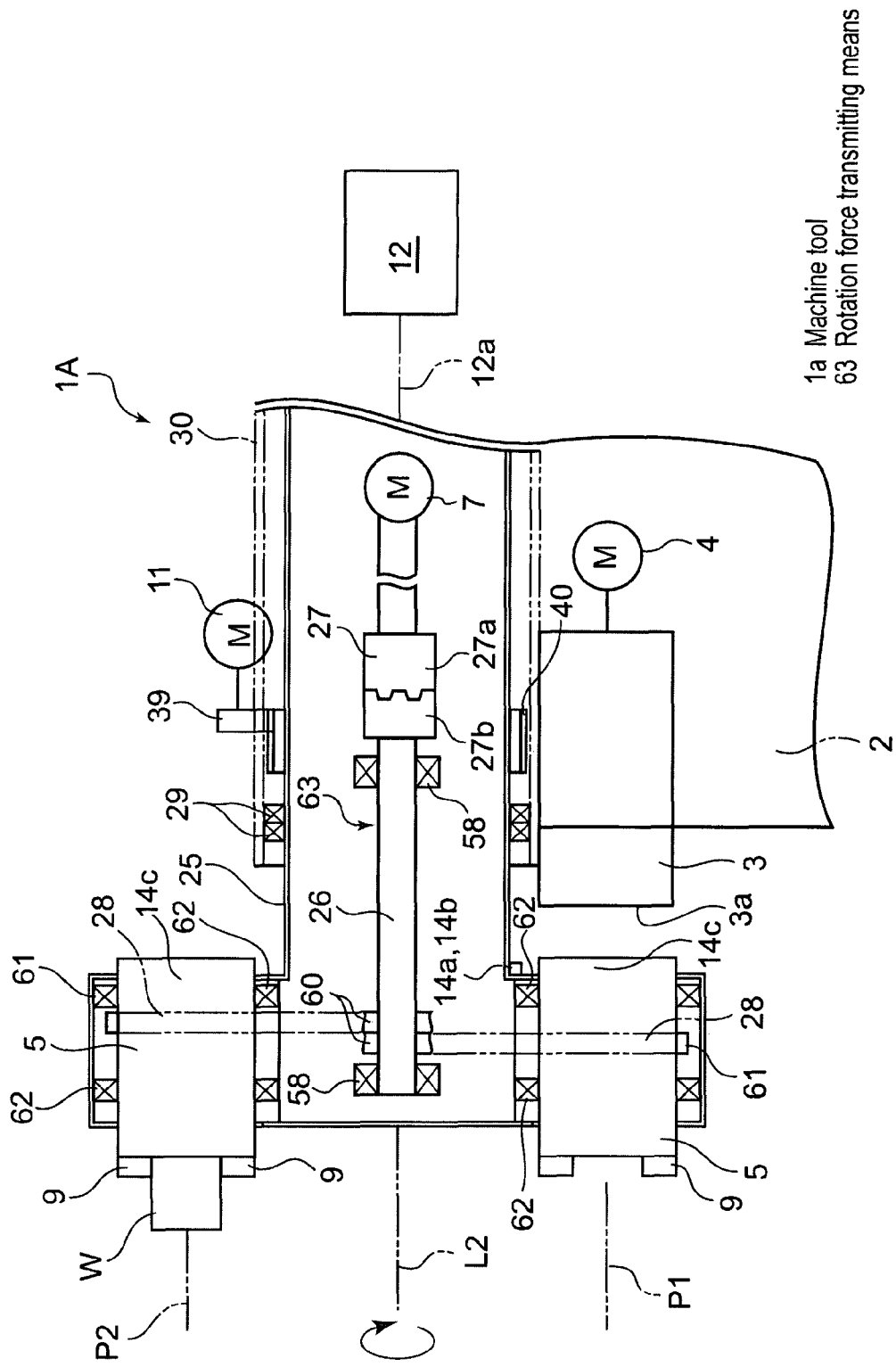
FIG. 13 is a sectional view of a machine tool with a spindle chuck replacing function according to a second embodiment of the present invention.
Figure 14:
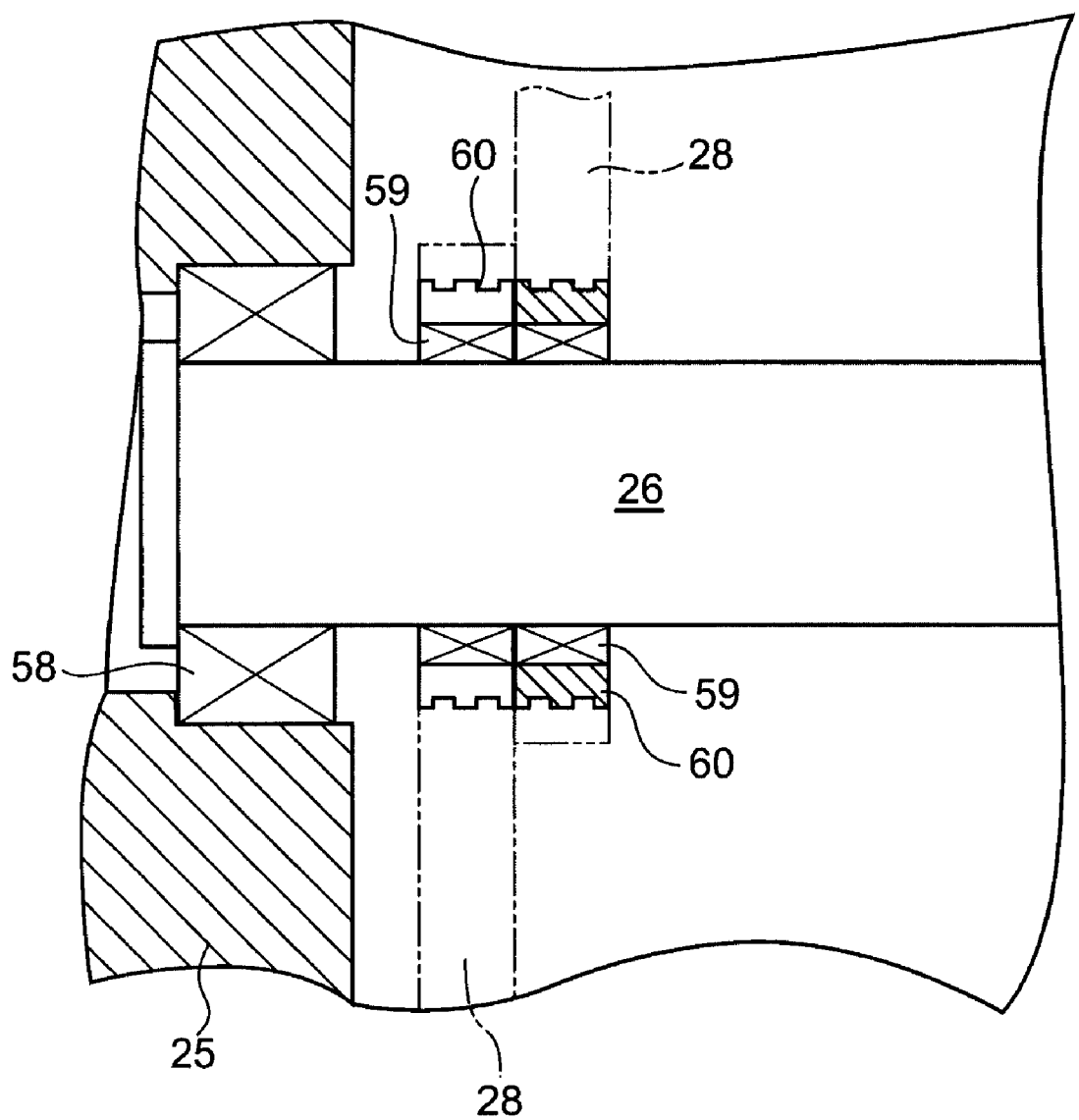
FIG. 14 is an enlarged sectional view of an essential part of the machine tool according to the second embodiment of the present invention.

As shown in FIG. 13, the turning arm 25 is supported by a plurality of bearings 29 so as to be turnable around an axis L2 of the turning arm 25. Furthermore, the gear 40, the pinion gear 39, the casing 30, the slide mechanism 31, the forward and backward driving source 12, the ball screw 32, the bearing 34, and the turning driving motor 11 are provided in substantially the same manner as shown in FIG. 5.

In the rotation speed sensing means 14, the light source 14a and the light receiving element 14b are provided at the tip portion of the turning arm 25. The reflector 14c is provided along the outer peripheral portion of each spindle chuck 5. The replacement spindle motor speed control means 21 applied in the second embodiment is similar to that shown in FIG. 12 and described in the first embodiment.

Operation of the above-described configuration will be described.

During processing of the work W held by the first spindle chuck 5, the second spindle chuck 5 runs idly via the one-way clutch 59. In this condition, the second spindle chuck 5 holding the next work W to be processed is rotated by the pre-rotation motor 7 via the one-way clutch 59, the belt 28, and the like. Thereafter, the fluid pressure cylinder 56 disengages the power transmitting portion 27a of the clutch 27 from the power transmitted portion 27b of the clutch 27. The second spindle chuck 5 thus rotates inertially.

After the processing of the work W by the first spindle chuck 5 is completed, the holding mechanism disengages the first spindle chuck 5 from the chuck coupling portion 3a. Thus, the spindle motor 4 is decoupled from the first spindle chuck 5. Thereafter, the forward and backward driving source 12 is driven to separate the first spindle chuck 5 from the chuck coupling portion 3a by a predetermined distance. The rotation speed of the inertially rotating second spindle chuck 5 is sensed by the encoder. The rotation speed of the spindle motor 4 is controlled according to the rotation speed sensed by the encoder so as to synchronize with the sensed speed. The turning driving motor 11 drivingly turns the turning member 8 through 180 degrees to place the second spindle chuck 5 holding the work W, at the spindle opposite position P1. Then, the forward and backward driving source 12, the chuck engaging mechanism 35, and the like drivingly couple the second spindle chuck 5 to the chuck coupling portion 3a. Thereafter, the work W held by the second spindle chuck 5 is processed. This operation is subsequently repeated.

In this configuration, during processing of the work W by the spindle motor 5, the spindle chuck 5 located at the work replacement position P2 is subjected to what is called idle running by the one-way clutch 59. This allows the work W to be installed on and removed from the spindle chuck 5 located at the work replacement position P2. When the pre-rotation motor 7 is used to rotate the spindle chuck 5 for the next processing located at the work replacement position P2, the spindle chuck 5 can be reliably rotationally driven by the one-way clutch 59. In particular, after the spindle chuck 5 for the next processing is rotationally driven by the pre-rotation motor 7 via the rotation force transmitting means 63, the separation of the power transmitting portion 27a from the power transmitted portion 27b and other appropriate operations are performed. Then, the rotation speed of the spindle motor 4 is synchronously controlled. Immediately after this, the spindle chuck 5 can be smoothly coupled to the spindle 3. The second embodiment also exerts other effects similar to those of the first embodiment.

As a third embodiment of the present invention, the separation mechanism 41 shown in FIG. 6 for the first embodiment may be omitted. In this case, the spindle chucks 5 are integrally provided on the turning member 8. This enables a reduction in the number of parts of the machine tool 1 and allows the structure of the machine tool 1 to be simplified, enabling a reduction in production costs. The third embodiment also exerts other effects similar to those of the first embodiment.

As another embodiment, at least three spindle chucks may be provided. The work holding structure of the spindle chuck is not limited to the one shown in FIGS. 9 and 10. For example, a helical compression spring may be applied instead of the helical tension spring 19 so that an inner diameter surface of a cylindrical work can be held by using the spring force of the helical compression spring to displace the chuck jaws 9 radially outward.

The helical tension spring, the helical compression spring, or the like may be omitted so that the work can be held by the fluid pressure of the fluid pressure cylinder.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A machine tool with a spindle chuck replacing function comprising:
   a plurality of spindle chucks;
   a spindle having a chuck coupling portion with one of the spindle chucks replaceably coupled to a tip thereof, the spindle being rotatably supported on a spindle support member;
   a spindle motor rotationally driving the spindle;
   the plurality of spindle chucks having a function of holding a work and being replaceably coupled to the chuck coupling portion of the spindle;
   a spindle chuck replacing mechanism rotatably holding the plurality of spindle chucks and transferring any one of the spindle chucks from a spindle opposite position to a work replacement position where a work on the any one spindle chuck is replaced, so as to deliver the any one spindle chuck to the chuck coupling portion of the spindle;
   a pre-rotation motor rotating the any one spindle chuck held at the work replacement position by the spindle chuck replacing mechanism, before the any one spindle chuck is placed at the spindle opposite position;
   a rotation speed sensing means for sensing rotation speed of the spindle chuck rotated by the pre-rotation motor; and
   a replacement spindle motor speed control means for controlling the rotation speed of the spindle motor according to the speed sensed by the rotation speed sensing means so that when the spindle chuck replacing mechanism passes the spindle chuck located at the spindle opposite position to the chuck coupling portion of the spindle, the rotation speed of the spindle synchronizes with the rotation speed of the spindle chuck located at the spindle opposite position.

2. The machine tool with a spindle chuck replacing function according to claim 1, characterized by including a pre-rotation motor power cut-off means for enabling the rotation of the spindle chuck held by the spindle chuck replacing mechanism and rotationally driven by the pre-rotation motor before the spindle chuck replacing mechanism performs an operation of passing the spindle chuck to the chuck coupling portion of the spindle.

3. The machine tool with a spindle chuck replacing function according to claim 1, characterized by including a rotation force transmitting means for transmitting a rotational driving force of the pre-rotation motor to the plurality of spindle chucks.

* * * * *